United States Patent [19]

Bugga et al.

[11] Patent Number: 5,554,457
[45] Date of Patent: Sep. 10, 1996

[54] FOIL POSITIVE ELECTRODES IN SODIUM-NICKEL CHLORIDE BATTERIES

[76] Inventors: Ratnakumar V. Bugga, 160 W. Floral Ave., Arcadia, Calif. 91006; Alan I. Attia, 41 Perry Dr., Needham, Mass. 02192; Gerald Halpert, 1000 E. California Blvd., Pasadena, Calif. 91106

[21] Appl. No.: 401,516

[22] Filed: Mar. 1, 1995

[51] Int. Cl.⁶ .................................................. H01M 4/58
[52] U.S. Cl. .................... 429/102; 429/101; 429/103; 429/104; 429/105; 429/273
[58] Field of Search .................................... 429/101, 102, 429/103, 104, 105, 223

[56] References Cited

U.S. PATENT DOCUMENTS

| | | | |
|---|---|---|---|
| 4,135,040 | 1/1979 | Thornton | 429/191 |
| 4,797,333 | 1/1989 | Coetzer et al. | 429/103 |
| 4,853,303 | 8/1989 | Steinleitner et al. | 429/104 |
| 4,895,776 | 1/1990 | Virkar et al. | 429/102 |
| 4,895,777 | 1/1990 | Kagawa | 429/104 |
| 4,975,344 | 12/1990 | Wedlake et al. | 429/103 |
| 5,019,470 | 5/1991 | Bugga et al. | 429/223 |
| 5,039,351 | 8/1991 | Cooper et al. | 136/202 |
| 5,057,384 | 10/1991 | Bones et al. | 429/104 |
| 5,143,802 | 9/1992 | Wright | 429/103 |
| 5,187,029 | 2/1993 | Coetzer et al. | 429/102 |
| 5,194,343 | 3/1993 | Bloom et al. | 429/218 |
| 5,230,968 | 7/1993 | Bones et al. | 429/191 |
| 5,279,908 | 1/1994 | Bloom et al. | 429/102 |

*Primary Examiner*—Stephen Kalafut
*Assistant Examiner*—Richard H. Lilley, Jr.

[57] ABSTRACT

Power density of a sodium/transition metal halide cell, particularly a Na/NiCl₂ cell is enhanced by forming a high area foil nickel chloride electrode such as a film of sintered nickel chloride deposited on an expanded metal screen and folded or coiled into a compact form and immersed in the aluminate salt catholyte disposed within a beta alumina solid electrolyte tube.

10 Claims, 2 Drawing Sheets

FOIL POSITIVE ELECTRODES IN SODIUM-NICKEL CHLORIDE BATTERIES

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates to high temperature, rechargeable, sodium/transition metal chloride cells and, more particularly, this invention relates to new positive electrodes for sodium-nickel chloride cells providing enhanced power densities.

BACKGROUND OF THE INVENTION

New types of electrical energy storage devices are needed to power electronic devices, electric vehicles and to smooth peak power demands on electric utilities. Some promising devices are based on the use of a solid electrolyte separator such as ceramic, beta alumina solid electrolyte (BASE).

Since the discovery in 1962 that the material β"-alumina was a good sodium ion conductor, several studies were made on its use as solid electrolyte separator in various battery systems with liquid sodium as anode. The interest for many years has been focused on sodium-sulfur battery, which has many attractive features such as high density, high rate discharge capability permitted by a good (comparable to aqueous electrolytes) ionic conductivity of β"-alumina solid electrolyte (BASE) at high temperatures and long cycle life and negligible self discharge. However, there are certain difficulties associated with the use of sodium-sulfur batteries. In particular, due to the highly corrosive nature of sulfide melts, material selection for the current collector in the positive electrode is very critical and limited to a few possible choices. Also, there is a likelihood of BASE degrading in polysulfide melts. Further, the inherent violent reaction between liquid sodium and liquid sulfur demand a rather sophisticated design of the battery to circumvent the safety problem in the event of failure of the solid electrolyte ceramic.

A new class of high temperature, sodium rechargeable batteries based on transition metal chlorides as positive electrodes have emerged in the last decade. These systems are similar to the sodium-sulfur batteries in terms of anode half cell and the (high) energy densities. In addition, the use of solid metal chloride cathodes in basic chloraluminate melts results in several significant advantages, including lower operating temperatures, improved safety and high reliability. Excellent performance characteristics have been demonstrated with both Na/FeCl$_2$ and Na/NiCl$_2$ systems in small and large cells as well as in batteries.

Sodium/transition metal chloride cells have lower power densities than sodium-sulfur cells. This has been attributed to higher polarization losses at the cathode. There have been proposals to reduce polarization at the cathode by modification of the β"alumina solid geometry to flat plate or multiple tube configurations. However, such configurations are not compatible with the present tubular BASE electrode design and would necessitate a major change in the methods of fabricating solid electrolytes for sodium/transition metal chloride cells.

Furthermore, an optimization study of Na/NiCl$_2$ batteries for space applications indicated that the optimum thickness for the cathode is 4 mm; electrodes thicker than 4 mm from the current collector have a reportedly high diffusional polarization and low utilization efficiencies. It may be difficult to achieve reasonable energy densities with Na/NiCl$_2$ cells if the cathode is constrained to these dimensions.

List of References

| | |
|---|---|
| 4,135,040 | Thorton |
| 4,797,333 | Coetzer, et al. |
| 4,853,303 | Steinleitner, et al. |
| 4,895,776 | Virkar, et al. |
| 4,895,777 | Kagawa |
| 4,975,344 | Wedlake, et al. |
| 5,019,470 | Bugga, et al. |
| 5,039,351 | Cooper, et al. |
| 5,057,384 | Bones, et al. |
| 5,143,802 | Wright |
| 5,187,029 | Coetzer, et al. |
| 5,194,343 | Bloom, et al. |
| 5,230,968 | Bones, et al. |
| 5,279,908 | Bones, et al. |

STATEMENT OF THE PRIOR ART

The present invention relates to a new method of enhancing the surface area of transition metal chloride electrodes in cylindrical sodium-nickel chloride cells to alleviate the high polarizations experienced at the positive electrodes and thus improve the power densities of the cells. The new electrode design involves the use of high surface area foil as the positive electrode disposed in a tubular solid electrolyte in a spirally wound or pleated (corrugated) configuration. Thorton, et al. (U.S. Pat. No. 4,135,040) describes the use of solid electrolyte body with textured surface to provide increased surface area on the solid electrolyte and on the positive electrode. Similarly, Wedlake, et al. (U.S. Pat. No. 4,975,344) suggested the use of corrugated beta alumina solid electrolyte. Bones, et al. (U.S. Pat. Nos. 5,039,351; 5,230,968 and 5,279,908) recommend a laterally compressed envelope of solid electrolyte for use as an electrode holder. Each solid electrolyte sheet in this design is provided with a plurality of ribs or corrugations. All these proposed designs suffer from the disadvantages as- sociated with forming the fragile and brittle solid electrolyte in complicated shapes.

Bloom, et al. (U.S. Pat. No. 5,194,343) relates to using NaCl of preregulated particle size in the process of cosintering NaCl with the metal powders to form electrodes containing uniform and larger pores. Coetzer (U.S. Pat. No. 5,187,029) describes a cell design containing plurality of electrode holders filled with active anode materials in contact with a reservoir for the active anode material and the cathode occupying the spaces between the holders. In another patent (U.S. Pat. No. 4,797,333) the use of precursor in the form of Al and alkali metal halide to form alkali metal and halcaluminate during initial charge was disclosed. Wright, et al (U.S. Pat. No. 5,143,802) contend that the use of a reservoir of chemically and electrochemically inert material in the cathode would wick the molten salt electrolyte and distribute it efficiently. Kagawa, et al. (U.S. Pat. No. 4,895,77) suggested the use of positive electroactive material divided into four parts and formed with a rough and rugged inner surface would alleviate the problem of sulfur build up during charging of a sodium sulfur cell. Bugga, et al. (U.S. Pat. No. 5,019,470) is related to the fabrication of positive electrodes in sodium-metal chloride batteries by impregnating the active material into a porous body. Patent Nos. 4,895,776 and 5,039,351 deal with the use of a fe-S mixture as a cathode in a Na-S cell and the use of metals as porous electrode deposits in an alkali metal thermoelectric converter.

The high area foil design of the electrolyte of the invention is not disclosed by the prior art references and is considered unobvious due to the numerous attempts of others to solve the polarization problem.

STATEMENT OF THE INVENTION

The cathode of the invention achieves high power densities in a sodium/transition metal halide battery without compromising on the energy density. The cathode is compatible with the present configuration of the solid electrolyte and does not necessitate fabrication of solid electrolytes in special form.

The non-cylindrical configuration of the cathode in the present invention has a large geometric area. The foil type electrode can be folded inside the BASE tube or wound outside the BASE tube. The preferred form of the battery is with the foil electrode folded inside the beta alumina tube with the liquid sodium on the outside. The foil may be in a spiral or corrugated or crenelated form.

The foil electrodes can be fabricated by dispersing transition metal chloride particles in a fugitive polymer binder, preferably an elastomeric hydrocarbon polymer such as an ethylene-propylene-diene monomer polymer such as EPDM dissolved in solvent such as cyclohexane. An emulsion dispersion of polytetrafluoroethylene in a suitable solvent could also be used as the binder. The solution or emulsion is coated onto a high area support such as an expanded nickel metal screen by rolling or coating. When the screen coated with a layer of binder resin is heated the solvent evaporates and the binder decomposes into vapor products leaving a layer of transition metal halide. Foil electrodes could also be fabricated by a doctor blade technique without binder following the technique used to prepare sintered nickel plaques for Ni/Cd batteries.

Spirally wound foil electrodes or folded corrugated foil electrodes have a high geometrical area of at least 35 $cm^2/Ah$ to 200 $cm^2/Ah$ compared to cylindrical electrodes which have a geometrical area of about 25 $cm^2/Ah$. When spirally wound or folded foil electrodes having a geometrical area of 85 $cm^2/Ah$ were placed inside a beta alumina tube in a Na/NiCl$_2$ battery, the electrodes exhibited a high conversion efficiency of about 98% at a rate of 50 mA(22 h).

Polarization losses, both ohmic and diffusional caused by slow mass transfer processes are significantly reduced with the high area foil electrodes of the invention. Rate capabilities of the foil electrodes should be much higher than cylindrical electrodes.

The high area foil electrodes of the invention alleviates polarization losses at the positive electrode, improves rate capabilities of the battery and thus enhances the power density of sodium/transition metal chloride cells containing the foil electrodes of the invention.

These and many other features and attendant advantages of the invention will become apparent as the invention becomes better understood by reference to the following detailed description when considered in conjunction with the accompanying drawings.

DETAILED DESCRIPTION OF THE INVENTION

The battery of the invention is based on a body of molten metal anode, solid ionic ceramic separator and a solid inorganic cathode in a molten salt. An anode current collector is in contact with the body of molten sodium and a cathode current collector is in contact with the catholyte. The anode current collector can take the form of a cylindrical or U-shaped metal tube such as stainless steel and the cathode current collector is a high area non-cylindrical foil such as a spiral or folded foil or transition metal chloride dispersed in the catholyte.

The solid electrolyte is preferably a thin film of beta alumina which is a sodium ion conductor. Beta alumina and beta"-alumina or their mixtures are members of the class of materials known as solid electrolytes or fast ion conductors for Na$^+$ions. These materials have ionic conductivities much larger than their electronic conductivities and thus act as electrolyte as well as separator. Beta"-alumina solid electrolyte (BASE) has a higher sodium conductivity than Beta alumina and is usually fabricated as a dense microcrystalline sintered ceramic. It is inert to reaction with elemental sodium at temperatures as high as 1300K. Its Na$^+$conductivity at 300° C. is 0.2–0.4 $ohm^{-1}$ $cm^{-1}$.

The solid electrolyte can assume different configurations such as a flat barrier film or the solid electrolyte can be provided in cylindrical form. The surface can be planar or corrugated. The solid electrolyte usually utilizes a fairly thin film, typically having a thickness from 0.01 to 0.2 cm, generally around 0.1 cm.

The liquid catholyte comprises a mixture of salts of Group I and Group III metals which is molten at the operating temperature of the battery. The molten salt is preferably a Group I metal salt and can be a mixture of Group I and Group III metal salt such as a sodium tetrachloroaluminate (NaAlCl$_4$). The molten salt is preferably maintained basic by saturating with NaCl. The ratio of NaAl:ACl$_3$ is preferably 1:1. The cathode current collector can have a thickness from 0.1 to 25 mm, the optimum thickness being about 4 mm.

Figure 1:
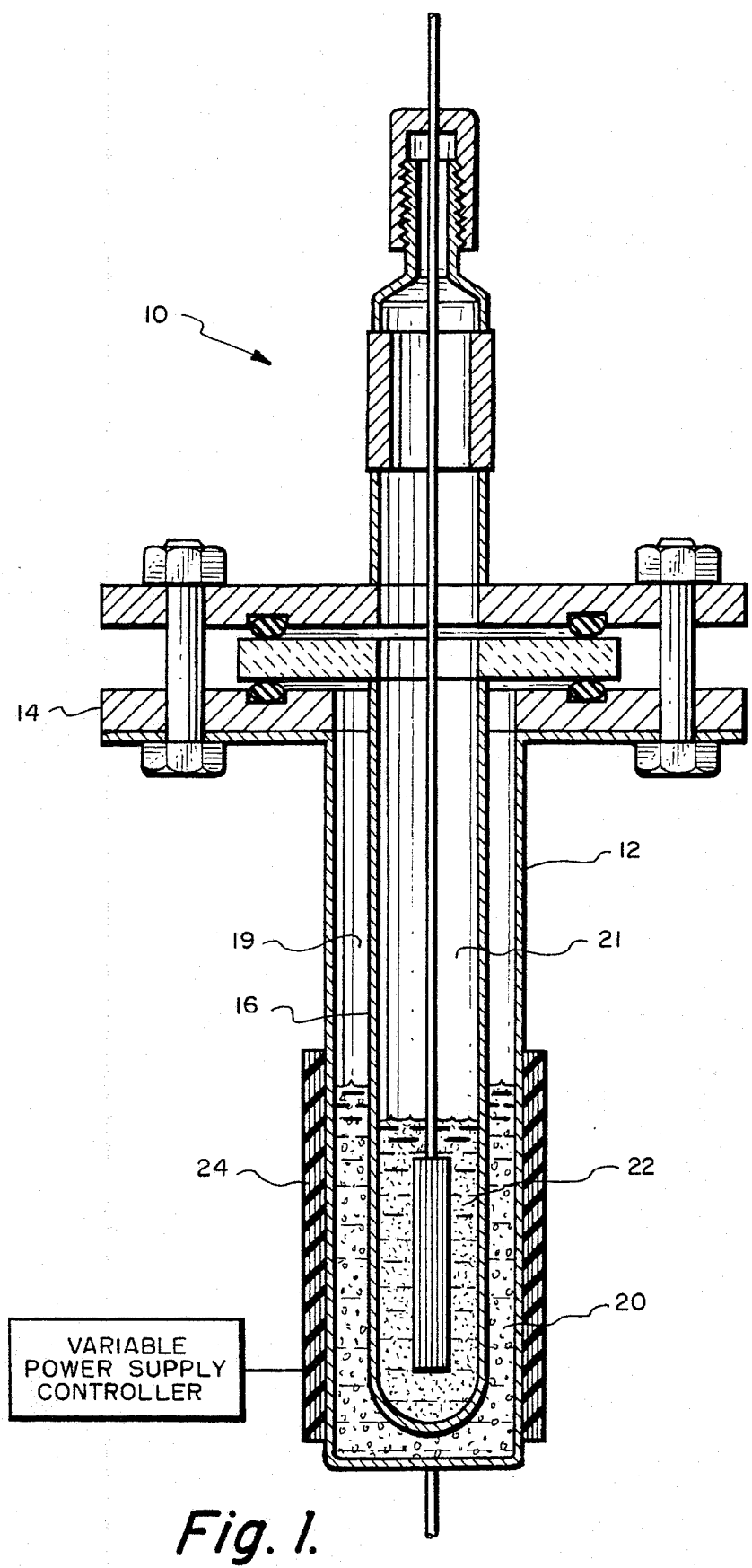
FIG. 1 is a schematic view of a sodium/transition metal chloride cell according to the invention.
Figure 2:
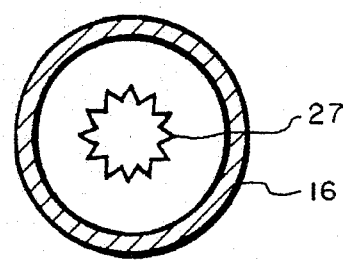
FIG. 2 is a cross sectional view of the high area folded foil cathode taken along line 2—2 of FIG. 1.
Figure 3:
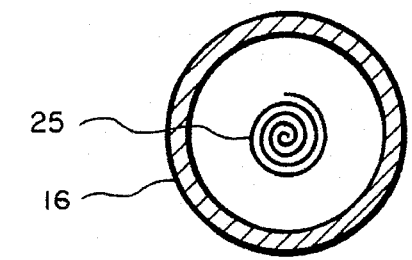
FIG. 3 is a sectional view of a spiral embodiments of the high area foil electrode of the invention.

Referring now to FIG. 1, a battery cell 10 comprises an outer cylindrical tube 12 having a flange 14, suitably formed of a conductive, corrosion resistant metal such as stainless steel. A BASE tube 16 is supported within the outer tube 12 forming an annular chamber 19 between the outer tube 12 and the BASE tube 16 for receiving body 20 of liquid anode such as sodium. A second chamber 21 is formed within the BASE tube 16 for receiving a second body 22 of catholyte. A high area foil current collector/electrode 24 such as a sintered NiCl$_2$ foil folded into a corrugated form is disposed within the body 22 of the cathode. The foil electrode can be folded into a spiral form 25 as shown in FIG. 3 or into a pleated form 27 as shown in FIG. 2.

Sodium-nickel chloride test cells were of central cathode design. A stainless steel tube acted as the cell container as well as the negative terminal. A beta"alumina solid electrolyte tube placed inside the SS tube separated the cathode and anode half cells. The columnar volume between the SS tube and the beta tube contained enough sodium to make the cells cathode limited. The insides of the beta tube were filled with sodium tetrachloroaluminate fused salt electrolyte. The sintered $NiCl_2$ electrode immersed in the molten salt acted as the positive electrode. The cell design included a mechanical compression seal. INCO nickel powder type 255 (~3 micron) was used for the fabrication of the $NiCl_2$ electrode. Sodium chloride obtained from Aldrich was preheated and pulverized to get a particle size less than 100 micron. Sodium tetrachloroaluminate as received from Johnson Matthey was premixed with 5 w % powdered NaCl. The cells were housed in cylindrical aluminum blocks heated with tape and holding about five cells each. The cell to cell variations in the temperature were thus eliminated. Beta" alumina tubes received from Ceramatec Inc. were cleaned by etching in hot phosphoric acid followed by baking at a temperature of ~800° C. All the cell fabrication and testing operations were carried out in an argon-filled glove box. Cell cycling was performed by a Macsym system developed in-house. Morphological studies on the cycled electrodes were made using scanning electron microscopy. All the experiments were carried out at a temperature of 275° C., unless specified otherwise.

The $NiCl_2$ electrode were fabricated by a cosintering of fine powders of Ni and NaCl mixed in the mole ratio of 3:1. On formation, one third of the Ni would thus be chlorinated, with the rest of the Ni acting as its grid. The built-in capacity of the electrode would correspond to it NaCl content.

Before the sintering process, the electrode powders were pressed at a minimum pressure. Loose sintered electrode from type 255 Ni powder would have a volume porosity in excess of 85%, which decreases both during pressing carried out before sintering and due to NaCl addition. $NiCl_2$ electrodes could also be made by loose sintering, simply by filling the beta alumina tube with the electrode powders and producing sintered-like structure during initial charge.

EXAMPLE 1

RECTANGULAR BLOCK CONFIGURATION

The first batch of the electrodes were fabricated in prismatic configuration at a compaction pressure of 10,000 psi. The electrodes obtained (1 Ah) are fairly dense, the charge density being 575 mAh/cc. Expectedly, its conversion efficiency is poor. At rates of 75 mA (13 h), 30 mA (30 h) and 20 mA (40 h), the electrode has conversion efficiencies of 22%, 48% and 54%, as shown in Table 1. The low porosity of the electrode prevents the access of the electrolyte to the interior portions of the electrode.

EXAMPLE 2

CYLINDRICAL SPLIT CONFIGURATION

The next batch of electrodes were made in cylindrical shape with a split mold, in order to extract the electrode easily from the mold. Pressures enough to handle the electrode before sintering were adopted. These electrodes (2 Ah) also have a high charge density of 490 mAh/cc. The conversion efficiency of the electrodes has, however, improved to 60% at a rate of 100 (20 h) and increased to 70% after one charge-discharge cycle. The conversion efficiency decreased to 45% at 200 mA (10 h) but increased to ~100% at 25–50 mA (80 to 40 h) (Table 1).

EXAMPLE 3

LOOSE SINTERED CONFIGURATION

The next generation of electrodes were fabricated in loose sintered form. The cylindrical mold was filled with the electrode powders and the electrode was sintered while being retained in the mold. These electrodes (2 Ah) appeared highly porous and have a low charge density of 296 mAh/cc. The current efficiencies of these electrodes are accordingly high, ~100% at a charge rate of 100 mA (20 h) (FIG. 1) (Table 1).

It is interesting to note that the discharge efficiencies in all the above electrodes are high (above 90%), suggesting that the portions of the electrodes participated in the charging process are fairly efficient in the subsequent discharge.

The sintering of the electrode was carried out in an inert (argon) atmosphere at temperatures slightly below the melting point of NaCl (801° C.) for a period of 2 hours. In subsequent experiments, the sintering was carried out for only 15 minutes and in a reducing atmosphere (3% hydrogen).

EXAMPLE 4

Figure 4:
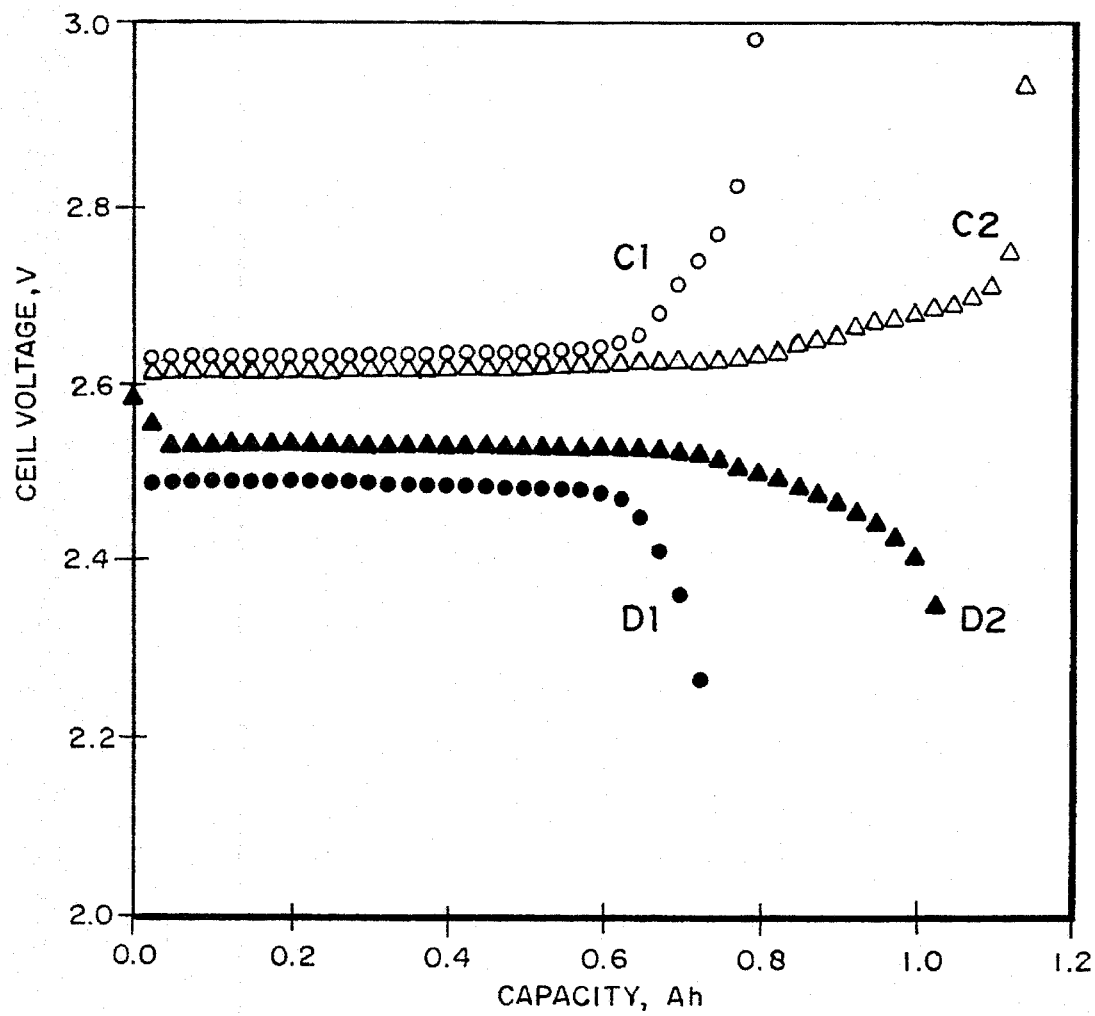
FIG. 4 are charge/discharge curves of a 1.2 Ah spirally wound NiCl$_2$ foil electrode fabricated with a EPDM binder prior to sintering.

Flat $NiCl_2$ electrodes were fabricated by mixing the electrode powders with an elastomeric binder such as EPDM. The binder material decomposed and vaporized during sintering. The large-area sheet electrode was fabricated by rolling the dispersion onto a nickel Exmet. The electrode was spirally wound to accommodate into the beta alumina tube. Electrodes thus made have a high geometrical area of 85 $cm^2$/Ah as compared to cylindrical electrodes (~25 $cm^2$/Ah). These electrodes have high conversion efficiencies of ~98% at a rate of 50 mA(22 h) (FIG. 4). The rate capabilities of the electrodes are expected to be superior to the cylindrical electrodes. Though the primary current distribution appears to be non-uniform especially in the spirally wound design, the high conductivity of the molten salt might offset this Such sheet electrodes may also be made with a doctor's blade technique without any binder as is commonly done with sintered Ni plaques in Ni/Cd batteries.

The results are presented in Table 1 and FIG. 4. FIG. 4 represents a first discharge curve for the foil electrode @75 mA ($C_1$), a first discharge @150 mA ($D_1$). $C_2$ and $D_2$ are at 50 mA and 75 mA, respectively.

TABLE 1

| ELECTRODE DESCRIPTION | CHARGE DENSITY | APPAR. AREA | POROSITY | CHARGE EFFICIENCY |
|---|---|---|---|---|
| Rectangular Block | 575 mAh/cc | 12.9 $cm^2$ | 31% | 22% @ 13 h<br>48% @ 30 h<br>54% @ 40 h |
| Foil (Spiral | ~150 mAh/cc | 90 $cm^2$ | — | 98% @ 22 h |

TABLE 1-continued

| ELECTRODE DESCRIPTION | CHARGE DENSITY | APPAR. AREA | POROSITY | CHARGE EFFICIENCY |
|---|---|---|---|---|
| or Corrugated) Cylindrical (split Mold) | 490 mAh/cc | 15.8 cm$^2$ | 37% | 45% @ 10 h<br>70% @ 20 h<br>~100% @ 40 h |
| Loose Sintered | 296 mAh/cc | 48 cm$^2$ | 60% | ~100% @ 20 h |

The cell may contain other materials such as sulfur or other transition metal added to the cathode. The foil electrode and catholyte could be placed outside the ceramic tube.

It is to be realized that only preferred embodiments of the invention have been described and that numerous substitutions, modifications and alterations are permissible without departing from the spirit and scope of the invention as defined in the following claims.

We claim:

1. A rechargeable sodium/transition metal halide cell comprising in combination:
    a first body of molten sodium;
    a second body of molten catholyte salt;
    a ceramic separator capable of transporting sodium ions between said bodies disposed between and separating said bodies;
    an anode connected to said first body; and
    a spirally wound or corrugated foil cathode immersed in the second body, said cathode comprising transition metal halide.

2. A cell according to claim 1 in which the transition metal halide is nickel chloride and the catholyte is an aluminate salt.

3. A cell according to claim 2 in which the cathode has a geometrical area of at least 35 cm$^2$/Ah.

4. A cell according to claim 3 in which the ceramic separator is in tubular form and said second body is disposed within said tubular separator.

5. A cell according to claim 4 in which the bent foil electrode is in spiral form.

6. A cell according to claim 4 in which the bent foil electrode is in folded form.

7. A method of forming a transition metal cathode for a rechargeable sodium/transition metal halide cell having a tubular ceramic separator containing a body of molten aluminate salt contained within the tubular separator comprising the steps of:
    forming a thin foil of a transition metal halide;
    bending the foil into a high surface area compact form; and
    placing the bent foil within the body of molten aluminate.

8. A method according to claim 7 in which the foil is bent into a spiral or folded form.

9. A method according to claim 7 in which the foil is formed by dispersing particles of transition metal halide in fugitive, polymeric binder and decomposing the binder to form a sheet of foil.

10. A method according to claim 7 in which the transition metal halide is nickel chloride.

* * * * *